United States Patent
Thompson et al.

(10) Patent No.: US 7,065,438 B2
(45) Date of Patent: Jun. 20, 2006

(54) JUDGMENT LOCK FOR OCCUPANT DETECTION AIR BAG CONTROL

(75) Inventors: Gregory T. Thompson, Jonesboro, GA (US); Shiuh-An Shieh, Alpharetta, GA (US); Keiichi Hasegawa, Stockbridge, GA (US); Svetoslav G. Stoyanov, Atlanta, GA (US)

(73) Assignee: Elesys North America, Inc., McDonough, GA (US)

( * ) Notice: Subject to any disclaimer, the term of this patent is extended or adjusted under 35 U.S.C. 154(b) by 137 days.

(21) Appl. No.: 10/133,970

(22) Filed: Apr. 26, 2002

(65) Prior Publication Data
US 2003/0204295 A1 Oct. 30, 2003

(51) Int. Cl.
*G06F 7/00* (2006.01)

(52) U.S. Cl. .................. 701/45; 280/735; 280/734; 280/730.2; 280/728.1; 280/728.2

(58) Field of Classification Search .............. 701/45; 280/735, 734, 730.2, 730.1, 728.1, 728.2
See application file for complete search history.

(56) References Cited

U.S. PATENT DOCUMENTS

| | | | |
|---|---|---|---|
| 5,948,031 A | 9/1999 | Jinno et al. | |
| 6,161,070 A | 12/2000 | Jinno et al. | |
| 6,329,913 B1 | 12/2001 | Shieh et al. | |
| 6,329,914 B1 | 12/2001 | Shieh et al. | |
| 6,636,792 B1 * | 10/2003 | Lichtinger et al. ............ | 701/45 |
| 6,684,973 B1 | 2/2004 | Baba et al. | |

\* cited by examiner

*Primary Examiner*—Olga Hernandez
(74) *Attorney, Agent, or Firm*—Brinks Hofer Gilson & Lione

(57) ABSTRACT

Systems and methods for controlling the sensing of an occupant in a seating area are provided. The occupant is characterized as one of an adult, child or other category. One characterization change parameter, such as a hysteresis time period or thresholds for characterization, is applied for a first time period. After that time period, the characterization change parameter is changed. For example, if the characterization stays the same for ten seconds, the hysteresis is changed from five to ten seconds. As another example, if the characterization stays the same for one minute, the thresholds associated with that characterization are broadened to decrease the likelihood of a change in characterization. In some systems and methods, a confidence parameter or probability associated with the characterization is used to control the changes of the characterization change parameter. In some systems and methods, the characterization change parameter is reset in response to one of (a) a no occupant characterization or (b) characterizing the occupant as a different one of the at least two categories consecutively for a current hysteresis time period.

24 Claims, 2 Drawing Sheets

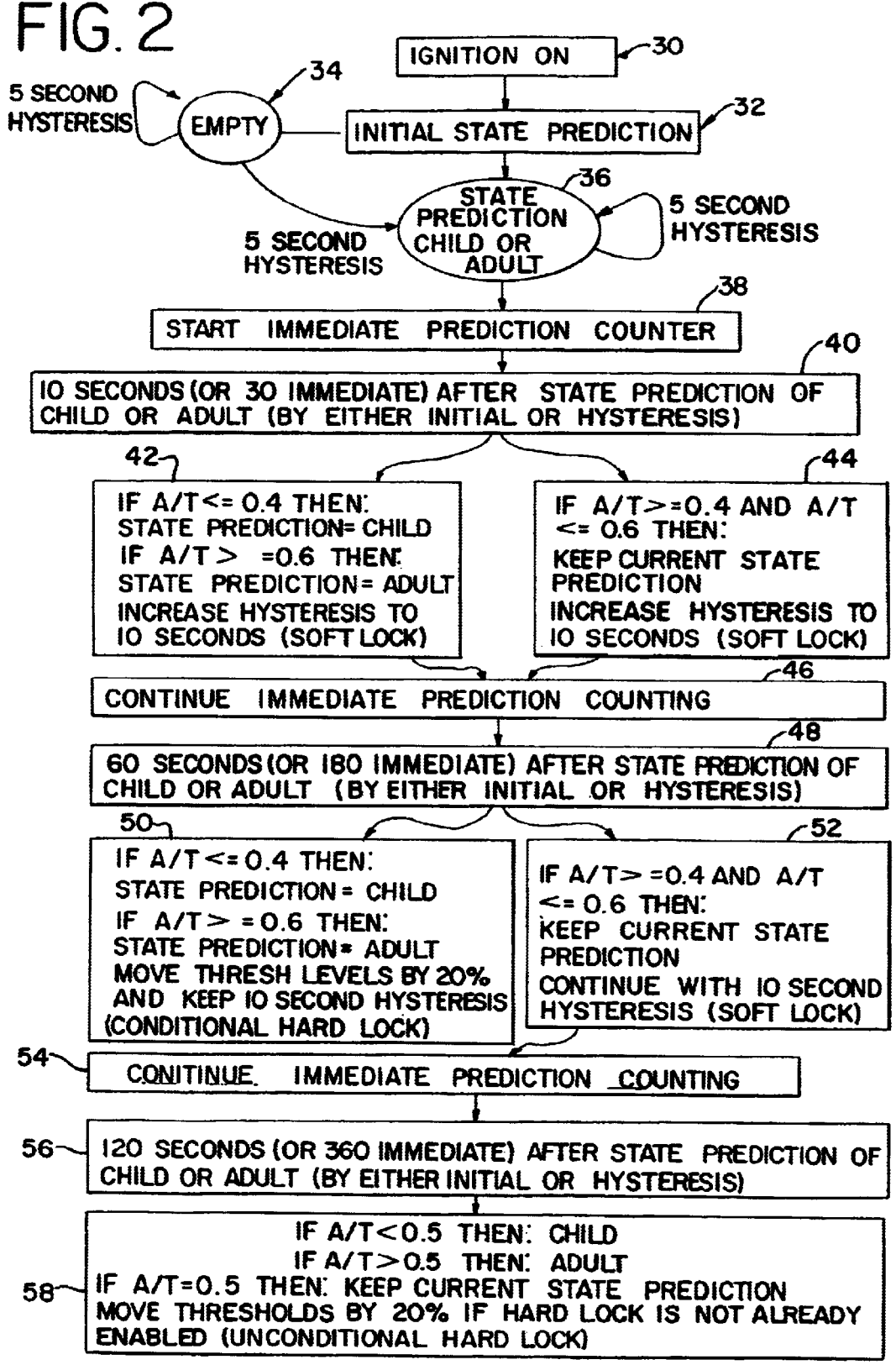

JUDGMENT LOCK FOR OCCUPANT DETECTION AIR BAG CONTROL

BACKGROUND

The present invention is related to passenger detection systems, and in particular to passenger detection systems that classify an attribute of a passenger of an automobile in which an air bag device is installed.

Air bag devices ease the shock that a passenger experiences during an automobile collision. Air bags may be installed in front of the driver's and passenger's seats. Air bags may be installed in other locations, such as to the side of a passenger.

Many air bags are designed to deploy in front of the torso of an adult passenger seated in the seat. When a rear facing infant seat (hereafter RFIS) is located on the front passenger seat, it is desirable for the passenger-side air bag not to deploy. It may also be desirable for the air bag not to deploy for a forward facing child seat (hereafter "FFCS"), child or small adult. Likewise, deployment may be limited for side impact airbags based on whether a child or short person is leaning towards the air bag. Other reasons for preventing or limiting deployment (e.g. deploying with less force) may exist.

Passenger detection sensors have been proposed for detecting a RFIS, an FFCS or children. Systems using electric fields to detect characteristics of a load in a seat are disclosed in U.S. Pat. Nos. 5,948,031, 6,329,913, 6,329,914, 6,816,077 (Ser. No. 09/798,788, filed Mar. 2, 2001) and U.S. Pat. No. 6,696,948 (Ser. No. 10/033,585, filed Nov. 2, 2001). Other systems using capacitive sensing, such as systems to detect a change in phase or frequency due to the presence of a passenger, have also been proposed. Both types of systems rely on transmission and/or reception from one or more antennas or electrodes. Other passenger detection systems use ultrasound, infrared, light electromagnetic energy or other transmissions or receptions to detect one or more characteristics of occupants. Yet another type of detection system uses weight sensors, strain gauges, pattern recognition or other techniques or devices.

These occupant detection sensors are subjected to changing environmental conditions. Acceleration, deceleration, shocks from bumps or potholes or other factors may cause the sensor measurements or judgments to change frequently. The change is caused by a direct effect on the sensor or the shifting of an occupant's position in response to the changing conditions. As a result, the judgment and any indicators blink or change even though the detected occupant is the same. The sensor judgment may change even more frequently or in response to lesser changes in the environment for occupants close to judgment thresholds, such as a child just large enough to be classified as an adult or an adult small enough to be near the child threshold. Drivers may assume the changing judgment is associated with a faulty system and attempt to get the system fixed when nothing is wrong.

To avoid frequent changes in occupant detection based on changing environmental conditions, a five second hysteresis has been used. The final judgment or measurement conclusion changes only if five continuous seconds of measurements indicate the different judgment. However, some occupant movements or environmental conditions, such as extended turns on highway ramps or acceleration up a long hill, can continue for more than 5 seconds.

SUMMARY

The present invention is defined by the following claims, and nothing in this section should be taken as a limitation on those claims. By way of introduction, the preferred embodiments described below include systems and methods for controlling the sensing of an occupant in a seating area. The occupant is characterized as one of an adult, child or other category. One characterization change parameter, such as a hysteresis time period or thresholds for characterization, is applied for a first time period. After that time period, the characterization change parameter is changed. For example, if the characterization stays the same for ten seconds, the hysteresis is changed from five to ten seconds. As another example, if the characterization stays the same for one minute, the thresholds associated with that characterization are broadened to decrease the likelihood of a change in characterization.

In some systems and methods, a confidence parameter or probability associated with the characterization is used to control the changes of the characterization change parameter. In some systems and methods, the characterization change parameter is reset in response to one of (a) a no occupant characterization or (b) characterizing the occupant as a different one of the at least two categories consecutively for a current hysteresis time period.

Further aspects and advantages are described below.

BRIEF DESCRIPTION OF THE DRAWINGS

FIG. 2 is a flow chart diagram of one embodiment of controlling the sensing of an occupant.

DETAILED DESCRIPTION OF THE INVENTION

Figure 1:
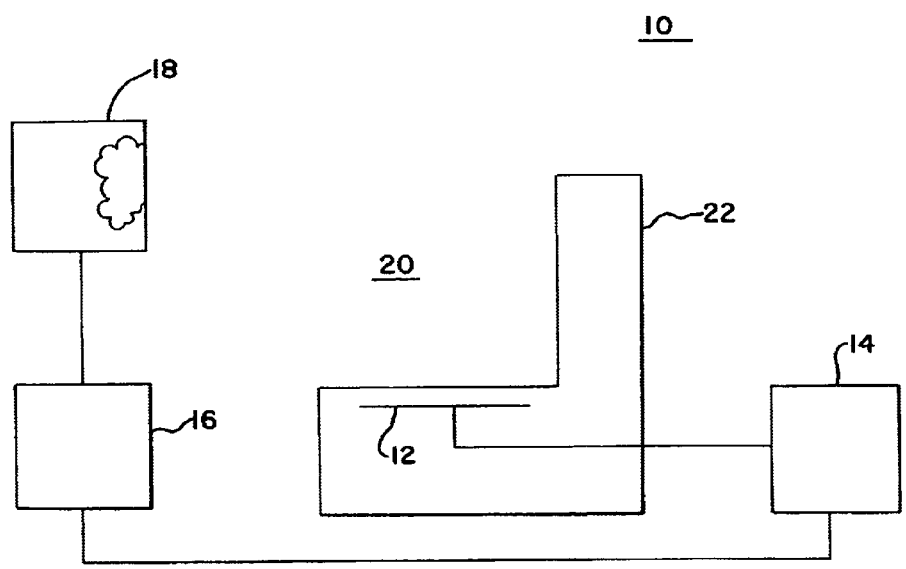
FIG. 1 is a block diagram of one embodiment of a vehicle passenger detection system for controlling the sensing of an occupant in a seating area.

To avoid frequently changing characterizations of an occupant, the characterization is made progressively more difficult to change. The difficulty is increased by a greater hysteresis time period and/or changing the thresholds or algorithm used to characterize the occupant to be more inclusive for a current characterization. A confidence of the current characterization may be used to determine the level or amount of difficulty to change. The increased difficulty is decreased either by detecting an unoccupied seat or by consistent determination of a different characterization using the greater hysteresis or more inclusive thresholds.

FIG. 1 shows a vehicle passenger detection system 10 of one embodiment for controlling the sensing of an occupant in a seating area. The system 10 includes one or more sensors 12, a control processor 14, an air bag controller 16 and an air bag 18. Additional, different or fewer components may be used, such as combining the control processor 14 and air bag controller 16. The vehicle passenger detection system is used to characterize or detect a passenger in an automobile or other vehicle. In one embodiment described below, the vehicle passenger detection system is used for controlling, limiting or altering deployment of air bags. The vehicle passenger detection system can be used for other purposes, such as controlling settings or operation of any vehicle system based on an occupant characteristic.

The system 10 may be implemented with various circuits and/or methods.

Some exemplary electric field based circuits and methods are discussed in U.S. Pat. Nos. 5,948,031, 6,161,070, 6,329,913, 6,329,914, 6,816,077 (Ser. No. 09/798,788, filed Mar. 2, 2001) and U.S. Pat. No. 6,696,948 (Ser. No. 10/033,585, filed Nov. 2, 2001), the disclosures of which are incorporated herein by reference. In alternative embodiments, the vehicle passenger detection system 10 comprises weight, capacitive, ultrasound, infrared, visible light or other sensing systems for detecting the presence of a passenger. Any device now known or later developed for detecting an occupant may be used.

The sensor 12 comprises a passive or active sensor for transmitting or receiving energy as part of an occupant detection system. In one embodiment, the sensor 12 comprises at least one electrode antenna. In another embodiment, the occupant detection sensor 12 comprises a plurality of electrodes. The electrodes are of any shape and position. For example, rectangular strips of electrodes are positioned in two or more layers separated by air or a divider (e.g. foam insulator).

Electrodes include a single wire, single conducting layer, two or more conductors, capacitance sensors, antenna or other structure for transmitting or receiving electromagnetic energy. In alternative embodiments, the sensor 12 comprises a weight sensor, strain gauge, piezoelectric material, micromachined component, ultrasound transducer, diode, light sensor, camera, semiconductor or other device for generating or detecting energy, such as ultrasound, infrared, light or other energy.

The sensor 12 is positioned adjacent to a seating area 20. For example, the sensor 12 is in a seat 22. As another example, the sensor 12 is in a steering column or dashboard in front of the seat 22, in the roof above the seat 22, on a door beside the seat 22 or on a floor below the seat 22. Other positions may be provided. Multiple sensors of a same or different type may be positioned in the same or different locations. The same or different sensors may be used for detecting one occupant or multiple occupants in different seating areas.

In one embodiment using either or both of capacitive or electric field sensing, minute electric fields between two electrodes positioned in the passenger seat are detected. An electric field is created as a result of the potential difference between the electrodes when a high-frequency, low-voltage signal is applied to one electrode and the other electrode is connected to ground. This electric field produces a current (the receive current) flowing from one electrode (non-transmitting) to ground. If a body (passenger or occupant) is present in the electric field, disturbances in the electric field alter the current. Likewise, a current (the loading current) provided to the transmitting electrode is also altered in response to the presence of the body. A loading current may be used without a receive current or measurement in another electrode.

The body acts as a capacitor having one terminal connected to ground. The impedance (resistance and capacitance) of the body shunts the electric field to ground. When the body is in the vehicle seat, changes in the current flowing at the transmitting and any receiving electrodes occur in response to the electrical characteristics of the body. For example, the loading current is larger for closer and/or larger bodies. As another example, the frequency response, phase or other signal characteristic changes in response to the occupant. Using these phenomenon, the presence of a passenger in the seat 22 is detected by comparing the detected current with a known value. In particular, one or more characteristics of the object in the seat are obtained, including whether or not the object is an adult-sized person sitting normally in the seat. By using electrodes at known or predictable different distances from the object, even more information is obtained. Therefore, the presence, location and other characteristics of the occupant in the seat 22 is precisely detected.

The control processor 14 electrically connects with the occupant detection sensor 12 of one or more seating areas for detecting a characteristic of one or more occupants. The control processor 14 comprises one or more of an application specific integrated circuit, processor, digital signal processor, analog components, digital device or combination thereof. For example, a microprocessor manufactured by NEC Corporation of Japan is used and includes analog to digital converters. In one embodiment, the control processor 14 includes the drivers and circuits for measuring signals to or from the occupant detection sensor 12. The occupant detection sensor 12 comprises just the passive antenna or the antenna and some associated circuitry. The control processor 14 is positioned in the vehicle seat 22 or elsewhere in the vehicle.

The control processor 14 characterizes the occupant in the seating area as one of at least two categories, such as adult, small adult, child, rear-facing child seat, forward facing child seat or other category. The categories may also include position information, such as a child leaning towards a door, a standing child or a properly seated child. Using one or more judgments, a final characterization is output.

The control processor 14 applies a characterization change parameter for a first time period and alters the characterization change parameter after the first time period. For example, the control processor 14 initially allows a change of characterization after measurements or judgments indicate the different characterization for five seconds, other time period or number of judgments. This characterization change parameter is a hysteresis parameter or time period. The characterization change is based on another characterization change parameter, the thresholds applied to categorize the occupant. Other characterization change parameters may be used. Any parameter for characterizing the occupant may be altered as a characterization change parameter, limiting any change of characterization differently.

After a certain amount of time, an event, a measurement, a probability or other designation, one or more characterization change parameters are altered, such as increasing the hysteresis time period or number of consecutive judgments before allowing a change of characterization. As another example, a characterization threshold, such as one or more of size, weight, surface area or other judgment indicator, is altered so the current characterization category is more inclusive. These alterations make the current characterizations more likely to continue, avoiding frequent changes in the characterization. Each judgment is more likely to match the current characterization being output. Other triggers may be used to further adjust a same or different characterization change parameter at other times.

The control processor 14 is also operable to determine a confidence parameter indicating a probability that the current characterization is correct. For example, the probability or confidence is calculated as a ratio of occurrences of the current judgment to a total number of judgments in a time period. The amount of time before alteration may be based on the confidence parameter. For example, the thresholds of a characterization are adjusted earlier to be more inclusive where the probability of a correct characterization are high. Where the probability is low, the thresholds are only adjusted after a longer time period of judgments consistent in characterization. In alternative embodiments, the confidence parameter is not calculated.

The control processor 14 is also operable to reset the characterization change parameter. For example, the hysteresis or thresholds are reset to starting levels (e.g. a 10 second hysteresis reset to a 5 second hysteresis) where an empty seat is detected. If the occupant leaves the seat, a different occupant may then enter the seat, so the characterization change parameters are reset or unlocked. As another example, the hysteresis or thresholds are reset to starting levels where the occupant is continually judged as in a different category despite the altered characterization change parameters. If the occupant is consistently detected as a child after increasing the hysteresis time period and/or altering thresholds based on a previous characterization of the occupant as an adult, the characterization change parameters are unlocked or returned to starting levels. Other reset triggers may be used.

The air bag controller 16 connects with the control processor 14. The air bag controller 16 responds to crash sensors and the control processor 14 to trigger deployment of the air bag 18. When a crash is sensed, but the control processor 14 indicates a child or other restricted class occupant, the air bag controller 16 may not deploy the air bag 18. When a crash is sensed and the control processor 14 indicates an adult or properly positioned occupant, the air bag controller 16 may cause the air bag 18 to deploy. The air bag controller 16 may also control the force, speed or other characteristic of deployment in response to an indication of the category of occupant from the control processor 14. In other embodiments, the control processor 14 and sensor 12 are used to detect a crash, such as detecting based on sudden head movement, and cause deployment of the air bag 18.

In one embodiment, a LED, liquid crystal display or other output device is provided to indicate the status of the characterization. For example, the LED is illuminated when the air-bag is disabled due to characterization as an child, small adult, child seat or other category. By locking the characterization or altering the characterization change parameter, this output is less likely to change or blink.

FIG. 2 shows a vehicle passenger detection flow chart of one embodiment for controlling sensing of an occupant in a seating area. In FIG. 2, the term "state prediction" is the output decision or characterization of the system after averaging, hysteresis or other operations based on one or more judgments. The term "immediate" is a system judgment for one discrete measurement cycle, including any averaging with previous cycles to output the current judgment.

In general, an occupant in a seating area is characterized, such as categorizing as a child or adult. Judgments for the characterization continually repeat, such as three or other number a minute. Initially, any changes in the characterization is limited by hysteresis. The new or different judgment of the characterization occurs over five seconds or a number of times before a new characterization is implemented or recognized. If the judgments of characterization are consistent for a first time period or number of characterizations, such as 10 seconds or 30 characterizations, a soft lock is implemented. A characterization change parameter is altered, such as increasing the hysteresis time period to 10 seconds or 30 characterizations. If after a minute or other time period, the judgments of characterization are still consistent, a hard lock is implemented for high probability characterizations. Where the confidence in the characterization is high, one, more or all of the thresholds associated with the current characterizations are broadened, such as increased or decreased, so more measurements are likely to be judged as the current characterization. If the judgments of characterization are still consistent after another minute or other time period, a hard lock is implemented for the characterization regardless of probability. If the characterization changes even with the current characterization change parameter settings, the characterization change parameters are reset and the process begins again.

In act 30, the ignition of the vehicle is turned on. Other beginning triggers may be used. In act 32, an initial state prediction or judgment is made. This initial judgment is used as the output characterization. If the seating area is empty, the judgments of characterization continue with a hysteresis of five seconds in act 34. Any of various information may indicate an empty seating area, such as comparing the actual current or phase readings of the sensor 12 to a threshold (e.g. current readings within a threshold amount of a calibrated empty reading), calculating a value for comparison to a threshold (e.g. total capacitance calculated and compared to a threshold) or combinations thereof. The characterization remains as empty until judgments of a non-empty characterization are repeated for five seconds or for 15 occurrences. Other hysteresis time or number of judgment values may be used.

After a change of characterization from empty or an initial determination of an occupant, the occupant is characterized as one of at least two categories in act 36. For example, the occupant is categorized as a child or an adult. In other embodiments, the occupant is categorized as (1) an adult in one or more positions, (2) a child or small adult in one or more positions, (3) a child in a forward facing child seat, (4) an infant in an rear facing child seat, or (5) another object. Additional or different categorizations may be used. The characterization is preferably determined by comparison to expected measurements. Alternatively, an algorithm that determines the distribution of the load is used to classify the occupant as large enough for air bag activation or to small for air bag activation. In yet another alternative embodiment, a function of the measurements determines the classification.

In one embodiment, the system 10 performs the following functions in a serial manner to judge or characterize the occupant: 1) output readings are compensated for cable length, 2) calculations are performed to correct for grounded occupant condition, 3) the complex impedance of the load is calculated using frequency data associated with different frequencies, 4) a distance between layers of electrodes is calculated, 5) the effective surface area of the occupant is calculated, 6) the distance of the occupant over a top-layer of electrodes is calculated, 7) judgment parameters to be used for occupant categorization are calculated, and 8) the judgment parameters are used to characterize the occupant based on initial predetermined thresholds. In one embodiment, the judgment parameters include weight, average of effective surface areas, maximum of effective surface areas, relative mass, the weight multiplied by the relative mass (i.e. mass product), total capacitance of load, and/or other values. If all of these parameters are above thresholds, the occupant is judged as an adult. If one judgment parameter is below the associated threshold, the occupant is judged as a child. In alternative embodiments, different thresholds are used, and/or two or more judgment parameters are needed to categorize the occupant as a child.

Once the occupant is characterized, the characterization is locked for a time period, such as 5 second hysteresis time period. As the processes for judgments of characterizing the occupant are sequentially repeated, subsequent different judgments are discarded or averaged and ignored until after the hysteresis period of time. The characterization provided as a control signal is not allowed to change until after the hysteresis time period. The characterization is not changed unless a certain number of consecutive or substantially consecutive judgments indicate that the characteristic has changed. In an alternative embodiment, the characterization changes without a time or number of instances limitation.

In act 38, a counter is started. For example, a timer is started or the number of judgments are counted. In act 40, the counter counts to 10 seconds, other time period or number of judgments as a first time period. The initial hysteresis, characterization thresholds and other characterization change parameters are applied during this time period. If the characterization changes with these current or initial characterization change parameters, the process returns to one of acts 34 or 36. For example, if a windowed average or all of the judgments indicate a characterization of child instead of an initial adult for five consecutive seconds based on comparison to current characterization thresholds, the characterization is changed to child.

If the characterization does not change during this first time period, the hysteresis, characterization thresholds or other characterization change parameter are increased in acts 42 and 44. In both of acts 42 and 44 of the embodiment of FIG. 2, the hysteresis time period is increased from five seconds to ten seconds or from 15 judgments to 30 judgments. Alternatively, if a certain number of judgments of characterizations during the time period do not indicate a change, one or more characterization change parameters are altered. The ratio of adult judgments to the total number of judgments (e.g. 30) during the first time period is determined. If the ratio is greater than or equal to 0.6, the category is set or remains as adult in act 42. If the ratio is less than or equal to 0.4, the category is set or remains as child in act 42. In act 44, if the ratio is greater than 0.4 and less than 0.6, the output characterization is not changed. For ratios that fall outside of these or other limits, the characterization is changed and the process reverts to acts 34 or 36. Alternatively, the ratio is not used and the characterization parameter is changed without response to the confidence in the current characterization.

In act 46, the counter continues to increment. During this additional time period, the current hysteresis (e.g. the altered 10 second hysteresis), characterization thresholds and other characterization change parameters are applied. If the characterization changes even with these current characterization change parameters, the process returns to one of acts 34 or 36 and the characterization change parameters are reset. In act 48, the counter counts to one minute, other time period or number of judgments (e.g. 180 judgments).

If the characterization does not change during this additional time period, a hysteresis, characterization thresholds or other characterization change parameter is altered in acts 50 or kept the same in act 52. In act 50, changes in the output characterization are further limited. The same or a different characterization change parameter than the characterization change parameter altered in acts 42 or 44 is altered after the additional time period. In the embodiment of FIG. 2, one, more or all of the characterization thresholds are changed by 20% or other amount. The thresholds are changed to more broadly define the current characterization, such as increasing the threshold values so more measurements likely indicate a child or decreasing the threshold values so more measurements likely indicate an adult. For example, the weight, relative mass, average surface area, maximum surface area and mass product thresholds are decreased so that future judgments more likely indicate an adult characterization. Different thresholds may be changed by different amounts and increased or decreased. Alternatively or additionally, the previously altered hysteresis or other characterization change parameter is further altered.

A confidence parameter is calculated to select between the hard lock or alteration of act 50 or the continued operation without further change of the characterization change parameters of act 52. The confidence parameter indicates the probability that the occupant is correctly categorized. For example, the ratio of adult judgments to the total number of judgments during the first (e.g. 10 seconds or 30 judgments), additional, or first plus additional time period is determined. In one embodiment, the judgments used include all or most valid judgments (e.g. 180 judgments) acquired since initializing the counter in act 38. The ratio calculated for acts 50 and 52 samples over a longer time period than the ratio of acts 42 and 44. Other ratios or indicators of confidence or probability may be used. If the ratio is greater than or equal to 0.6, the characterization is set or remains as adult in act 50. If the ratio is less than or equal to 0.4, the characterization is set or remains as child in act 50.

If the ratio is between 0.4 and 0.6, a lesser confidence or probability of correct characterization is indicated. The characterization is more borderline. In act 52, the output characterization or category and the characterization change parameters are not altered, but the current characterization is maintained. Alternatively, the characterization change parameters are reset, altered to further lock the current characterization but not as much as for act 50, or altered to reduces the soft lock of acts 42 and 44 without resetting the characterization change parameters. By maintaining the same characterization change parameters in act 50, the time period for application of the current characterization change parameters (e.g. altered once in acts 42 and 44) is increased. This time period is a function of the confidence parameter.

In act 54, the counter continues to increment where the characterization change parameters were not further changed or hard locked in act 50. During this additional time period, the current hysteresis (e.g. the altered 10 second hysteresis), characterization thresholds and other characterization change parameters are applied. If the characterization changes even with these current characterization change parameters, the process returns to one of acts 34 or 36 and the characterization change parameters are reset. In act 56, the counter counts to two minutes, other time period or number of judgments.

In act 58, the characterization change parameters are altered as a function of the confidence in the current characterization. The amount of confidence is reduced as compared to acts 50 and 52. For example, if the ratio is less than 0.5, the characterization is set to or remains as a child. If the ratio is more than 0.5, the characterization is set to or remains as an adult. If the ratio is equal to 0.5, the current characterization is used. Regardless of the characterization, the characterization thresholds are altered by 20% or other amount. For a child characterization, the thresholds are increased by 20%. For an adult characterization, the thresholds are decreased by 20%. Other amounts of alteration or characterization change parameters to be altered may be used.

Other processes than shown in FIG. 2 may be used. For example, three or more alternative alterations (e.g. acts 42 verses 44 or acts 50 verse 52) of characterization change parameters may be used as a function of different levels of confidence. Any number of alterations, such as just one, two, three or more, may be used. Any of time, number of judgments, confidence, probability or other information may be used for triggering alteration. The confidence value may be calculated as a function of a moving window of a previous number of judgments, for all the judgments made since initiating the counter in act 38, or other number of judgments. The confidence value may be based on other statistical calculations including or not including the number of judgments. The ratio of child judgments to total judgments may be used instead of the ratio of adult judgments to total judgments.

The characterization change parameter(s) are reset to initial levels in response to one of: (a) a no occupant judgment or (b) judging the occupant as a different one of the at least two categories consecutively for a current hysteresis time period using the current characterization thresholds. The no occupant judgment includes either an empty seating area or nearly empty seating area. For example, an object may be left on a seat is judged as a nearly empty seating area. In this example, the thresholds may be set so that reset occurs for a change to an occupant or object similar in characteristics to a three year old or smaller where the child category is based on a six year old or smaller. Other thresholds may be used. In one embodiment, the no occupant judgment is repeated twice consecutively before resetting. In alternative embodiments, once or three or more consecutive no occupant judgments result in a reset. In yet other alternative embodiments, the number of judgments for reset based on no occupant is based on the time for an occupant to leave the seat 22, seating area or automobile. Once reset, the process returns to acts 34 or 36.

Additional sensor inputs may be used. For example, the seat belt signal is input to the control processor 14. When the occupant sits and buckles the seat belt, the occupant is not likely to change without unbuckling. Buckling may trigger initiation of the counter of act 38 or a change in characterization change parameters. Unbuckling may trigger a reset or change in the characterization change parameters.

The air bag controller 16 suppresses deployment of the air bag 18 where the output characterization is empty, associated with an object, or child. A object judgment is counted as a child judgment for characterizing the occupant. Deployment of the air bag 18 is enabled where the output characterization is adult.

In one embodiment, the characterization thresholds are the same for distinguishing between an adult and a child. In other embodiments, overlapping thresholds are used to prioritize a type of classification. Thresholds are set to more easily change the classification from an adult to a child than from a child to an adult. For example, if the classification is an adult, then the maximum load threshold for classifying the occupant as a child is set higher than if the classification began as a child. Likewise, the threshold for a car seat classification may be different as a function of the most recent prior classification, resulting in prioritizing between an adult and/or a child and a car seat. This prioritization provides a gray zone or area between the thresholds. For example, the lower threshold may be based on the load for an average 6 year old child and the upper threshold may be based on a 5th percentile adult female. Any occupant classified within the gray zone is classified according to the priority, such as classification as a child. In this embodiment, the thresholds may be altered to provide broader, narrower or no overlap as a function of time or the confidence parameter.

While various embodiments have been described herein, changes and modifications may be made without departing from the scope of the invention which is defined by the following claims and equivalents thereof.

What is claimed is:

1. A vehicle passenger detection method for controlling sensing of an occupant in a seating area, the method comprising the acts of:

(a) characterizing the occupant in the seating area as one of at least two categories;

(b) applying a characterization change parameter for limiting change in the characterization of the occupant from the one to another one of the at least two categories, the application being for a first time period; and (c) altering the characterization change parameter after the first time period;

(d) determining first and second confidence parameters at first and second times, the first time different than the second time, the first confidence parameter a function of a first total number of judgments at the first time and the second confidence parameter a function of second total number of judgments at the second time;

wherein (a) comprises characterizing with a capacitive sensing system.

2. The method of claim 1 wherein (b) comprises applying a hysteresis to (a) for the first time period, and (c) comprises increasing an amount of time of the hysteresis.

3. The method of claim 1 wherein (b) comprises applying a characterization threshold and (c) comprises changing the characterization threshold so the one of the at least two categories is more inclusive.

4. The method of claim 1 further comprising:

(e) determining a confidence parameter different than the characterization change parameter;

wherein the first time period is a function of the confidence parameter.

5. The method of claim 1 further comprising:

(e) altering a different characterization change parameter after a second time period, the second time period overlapping and different than the first time period.

6. The method of claim 1 further comprising:

(e) resetting the characterization change parameter in response to no occupant characterization.

7. The method of claim 1 further comprising:

(e) controlling an air bag system in response to the characterization of (a).

8. A vehicle passenger detection method for controlling sensing of an occupant in a seating area, the method comprising the acts of:

(a) characterizing the occupant in the seating area as one of at least two categories;

(b) applying a characterization change parameter for limiting change in the characterization of the occupant from the one to another one of the at least two categories, the application being for a first time period; and (c) altering the characterization change parameter after the first time period;

(d) determining a confidence parameter different than the characterization change parameter;

wherein the first time period is a function of the confidence parameter and wherein (a) comprises characterizing with a capacitive sensing system;

wherein (d) comprises determining a ratio of occurrences of a first of the least two categories to a total number of judgments.

9. A vehicle passenger detection method for controlling sensing of an occupant in a seating area, the method comprising the acts of:

(a) characterizing the occupant in the seating area as one of at least two categories;

(b) applying a characterization change parameter for limiting change in the characterization of the occupant from the one to another one of the at least two categories, the application being for a first time period; and (c) altering the characterization change parameter after the first time period;

wherein (a) comprises characterizing with a capacitive sensing system, wherein (b) comprises applying a hysteresis to (a) for the first time period, and (c) comprises increasing an amount of time of the hysteresis;

further comprising:

(d) determining a ratio of occurrences of a first of the at least two categories to a total number of judgments in a second time period, the second time period longer than the first time period; and (e) if the ratio indicates a high confidence, altering a characterization threshold parameter; and (f) if the ratio indicates a low confidence:
(f1) waiting for a third time period; and
(f2) altering the characterization threshold parameter if the characterization of (a) is consistent during the third time period.

10. A vehicle passenger detection method for controlling sensing of an occupant in a seating area, the method comprising the acts of:

(a) characterizing the occupant in the seating area as one of at least two categories;

(b) applying a characterization change parameter for limiting change in the characterization of the occupant from the one to another one of the at least two categories, the application being for a first time period; and (c) altering the characterization change parameter after the first time period;

wherein (a) comprises characterizing with a capacitive sensing system;

further comprising:

(d) resetting the characterization change parameter in response to characterizing the occupant as a different one of the at least two categories consecutively for a current hysteresis time period.

11. A vehicle passenger detection system for controlling the sensing of an occupant in a seating area, the system comprising:

an occupant detection sensor adjacent the seating area, the occupant detection sensor comprising a capacitive sensing system; and a control processor operatively connected with the occupant detection sensor, the control processor operative to characterize the occupant in the seating area as one of at least two categories, apply a characterization change parameter for limiting change in the characterization of the occupant from the one to another one of the at least two categories, the application being for a first time period, and alter the characterization change parameter after the first time period;

wherein the control processor is operable to determine a confidence parameter different than the characterization change parameter, the first time period being a function of the confidence parameter.

12. The system of claim 11 wherein the characterization change parameter comprises a hysteresis parameter.

13. The system of claim 11 wherein the characterization change parameter comprises a characterization threshold, the control processor operable to alter the characterization threshold so the one of the at least two categories is more inclusive.

14. The system of claim 11 wherein the control processor is operable to alter a different characterization change parameter after a second time period, the second time period overlapping and different than the first time period.

15. The system of claim 11 wherein the control processor is operable to reset the characterization change parameter in response to one of: (a) a no occupant characterization or (b) characterizing the occupant as a different one of the at least two categories consecutively for a current hysteresis time period.

16. The system of claim 11 wherein the occupant detection sensor comprises an electrode antenna.

17. The system of claim 11 further comprising an air bag controller connected with the control processor.

18. A vehicle passenger detection method for controlling sensing of an occupant in a seating area, the method comprising the acts of:

(a) characterizing the occupant in the seating area as one of at least two categories;

(b) determining a characterization change parameter as a function of a probability of characterization accuracy; and (c) limiting a change of the characterization of (a) by the characterization change parameter; wherein (b) comprises determining a ratio of occurrences of a first of the at least two categories to a total number of judgments.

19. A vehicle passenger detection method for controlling sensing of an occupant in a seating area, the method comprising the acts of:

(a) characterizing the occupant in the seating area as one of at least two categories;

(b) applying a characterization change parameter for a first time period; and (c) altering the characterization change parameter after the first time period;

wherein (b) comprises applying a hysteresis to (a) for the first time period, and (c) comprises increasing an amount of time of the hysteresis.

20. A vehicle passenger detection method for controlling sensing of an occupant in a seating area, the method comprising the acts of:

(a) characterizing the occupant in the seating area as one of at least two categories;

(b) applying a characterization change parameter for a first time period;

(c) altering the characterization change parameter after the first time period; and (d) determining a confidence parameter different than the characterization change parameter;

wherein the first time period is a function of the confidence parameter.

21. The method of claim 20 wherein (d) comprises determining a ratio of occurrences of a first of the at least two categories to a total number of judgments.

22. A vehicle passenger detection method for controlling sensing of an occupant in a seating area, the method comprising the acts of:

(a) characterizing the occupant in the seating area as one of at least two categories;

(b) applying a characterization change parameter for a first time period;

(c) altering the characterization change parameter after the first time period; and (d) determining first and second confidence parameters at first and second times, the first time different than the second time, the first confidence parameter a function of a first total number of judgments at the first time and the second confidence parameter a function of second total number of judgments at the second time.

23. A vehicle passenger detection method for controlling sensing of an occupant in a seating area, the method comprising the acts of:

(a) characterizing the occupant in the seating area as one of at least two categories;

(b) applying a characterization change parameter for a first time period;

(c) altering the characterization change parameter after the first time period; and (d) resetting the characterization change parameter in response to characterizing the occupant as a different one of the at least two categories consecutively for a current hysteresis time period.

24. A vehicle passenger detection system for controlling the sensing of an occupant in a seating area, the system comprising:

an occupant detection sensor adjacent the seating area; and a control processor operatively connected with the occupant detection sensor, the control processor operative to characterize the occupant in the seating area as one of at least two categories, apply a characterization change parameter for a first time period, and alter the characterization change parameter after the first time period;

wherein the control processor is operable to determine a confidence parameter different than the characterization change parameter, the first time period being a function of the confidence parameter.

* * * * *